United States Patent
Dede et al.

(10) Patent No.: US 12,355,114 B2
(45) Date of Patent: Jul. 8, 2025

(54) PERMEABLE SUPPORT LAYER FOR FUEL CELL FLUID FLOW NETWORKS

(71) Applicant: Toyota Motor Engineering & Manufacturing North America, Inc, Plano, TX (US)

(72) Inventors: Ercan M. Dede, Ann Arbor, MI (US); Yuqing Zhou, Ann Arbor, MI (US)

(73) Assignee: TOYOTA MOTOR ENGINEERING & MANUFACTURING NORTH AMERICA, INC., Plano, TX (US)

(*) Notice: Subject to any disclaimer, the term of this patent is extended or adjusted under 35 U.S.C. 154(b) by 217 days.

(21) Appl. No.: 17/085,590

(22) Filed: Oct. 30, 2020

(65) Prior Publication Data

US 2022/0140359 A1    May 5, 2022

(51) Int. Cl.
*H01M 8/0258* (2016.01)
*H01M 8/0228* (2016.01)
*H01M 8/0232* (2016.01)
*H01M 8/0267* (2016.01)

(52) U.S. Cl.
CPC ....... *H01M 8/0258* (2013.01); *H01M 8/0228* (2013.01); *H01M 8/0232* (2013.01); *H01M 8/0267* (2013.01)

(58) Field of Classification Search
CPC ............. H01M 8/0223; H01M 8/0228; H01M 8/0232; H01M 8/0254; H01M 8/0258; H01M 8/0267; Y02E 60/50
See application file for complete search history.

(56) References Cited

U.S. PATENT DOCUMENTS

| | | | |
|---|---|---|---|
| 5,863,671 A * | 1/1999 | Spear, Jr. ............. | F28D 9/0075 429/465 |
| 6,555,261 B1 * | 4/2003 | Lewinski ............. | H01M 4/926 429/513 |
| 7,258,945 B2 | 8/2007 | Bekkedahl et al. | |
| 2002/0114990 A1 * | 8/2002 | Fly ...................... | H01M 8/2418 429/514 |
| 2004/0033410 A1 * | 2/2004 | Brady .................. | B32B 15/01 428/615 |

(Continued)

FOREIGN PATENT DOCUMENTS

| CN | 100466351 C | * 3/2009 |
|---|---|---|
| CN | 110120530 A | * 8/2019 |

OTHER PUBLICATIONS

CN110120530A, Cui et al., "Highly-breathable composition metal fuel battery double plates and preparation method", retrieved from PE2E on Sep. 28, 2022. (Year: 2019).*

(Continued)

*Primary Examiner* — Matthew T Martin
*Assistant Examiner* — Jared Hansen
(74) *Attorney, Agent, or Firm* — Jordan IP Law, LLC

(57) ABSTRACT

A fuel cell may include a first fuel cell bipolar plate defining an air layer, a second fuel cell bipolar plate defining a hydrogen layer, and a coolant layer defined by the air layer and the hydrogen layer. The coolant layer includes a plurality of coolant microchannels that facilitate flow of a coolant. A permeable support layer is arranged between the air layer and the hydrogen layer to define a gap therebetween to prevent flow blockage of the coolant microchannels while facilitating coolant flow therethrough.

20 Claims, 6 Drawing Sheets

(56) References Cited

U.S. PATENT DOCUMENTS

| | | | |
|---|---|---|---|
| 2008/0081239 A1* | 4/2008 | Okusawa | H01M 8/0258 |
| | | | 429/514 |
| 2010/0028742 A1* | 2/2010 | Jeon | H01M 8/242 |
| | | | 429/465 |
| 2011/0039190 A1* | 2/2011 | Owejan | H01M 8/0267 |
| | | | 429/518 |
| 2014/0099562 A1* | 4/2014 | Blanchet | H01M 8/2483 |
| | | | 204/267 |
| 2017/0110739 A1* | 4/2017 | Andreas-Schott | H01M 8/026 |
| 2019/0020041 A1* | 1/2019 | Paone | H01M 8/0267 |
| 2019/0221864 A1* | 7/2019 | Gambini | H01M 8/1004 |
| 2021/0226227 A1* | 7/2021 | Gu | H01M 8/026 |
| 2021/0313592 A1* | 10/2021 | Gao | H01M 8/0267 |

OTHER PUBLICATIONS

CN100466351C, Xinmin, et al. "Proton exchange film fuel battery dual-pole board based on thin plate punching", machine English translation retrieved from https://worldwide.espacenet.com/ Date: Jul. 11, 2024 (Year: 2009).*

* cited by examiner

PERMEABLE SUPPORT LAYER FOR FUEL CELL FLUID FLOW NETWORKS

TECHNICAL FIELD

Embodiments relate generally to a fuel cell (FC), and one or more methods of fabricating an (FC).

BACKGROUND

Hydrogen fuel cell (FC) technology has been utilized widely in a variety of stationary and non-stationary applications, e.g., space transport, satellites, motor vehicles, power generation, and electronics. The FC device converts chemical potential energy into electrical energy.

A FC stack generally comprises hundreds of FCs arranged in a stack formation. Each fuel cell comprises a hydrogen layer defined by a hydrogen plate having a plurality of channels for facilitating hydrogen flow into a reaction zone, an air layer defined by an air plate having a plurality of channels for facilitating air flow into the reaction zone, and a coolant layer defined by superposition or stacking of the hydrogen plate on the air plate. The hydrogen plate and the air plate may be fabricated by a stamping process to provide the plurality of channels.

The MEA is as a proton exchange membrane (PEM) cell having sides coated with a catalyst for the hydrogen oxidation (anode) and oxygen reduction (cathode). Gas diffusion layers (GDL) are used to deliver the reactant fuels to the electrodes from bipolar plate microchannels.

In operation, a first fuel reactant, for example, hydrogen ($H_2$), is supplied to the anode via a hydrogen layer, and a second fuel reactant, for example, oxygen ($O_2$) is supplied to the cathode via an air layer. Hydrogen and air enter the FC stack and mix within the reaction region of the MEA and flow through microchannels formed in the hydrogen layer and the air layer to produce electricity, with water and heat as reaction byproducts. Additionally, coolant also enters and exits the FC stack and flows outside of the reaction zones within coolant microchannels defined by the opposite sides of the hydrogen plate and the air plate.

Due to the discrete nature of the microchannels, a majority of the coolant layer can be blocked due to direct contact between the hydrogen plate and the air plate. For example, when a hydrogen channel is vertically aligned with an air channel, the coolant layer can be blocked at this location. This may, in turn, reduce the coolant flow within the coolant layer, which adversely effects the performance of the FC. In some regions, however, the coolant microchannels are very narrow or completely blocked, while in other regions the coolant microchannels are wide and open. This may lead to non-uniform thermal management throughout the FC stack, and consequently, inefficient FC stack performance.

BRIEF SUMMARY

In accordance with one or more embodiments, a permeable support layer is strategically positioned to extend between an air plate and a hydrogen plate to prevent flow blockage at the coolant layer, particularly in regions where there is direct contact between the air plate and the hydrogen plate. The permeable support layer can be strategically positioned between the air plate and the hydrogen plate in regions of the fuel cell where there is no air microchannel and no hydrogen microchannel.

The permeable support layer is configured to facilitate a clear path for coolant flow within the coolant layer by ensuring spacing or a gap between the air layer and the hydrogen layer, while also permitting coolant flow through the permeable support layer. This provides more uniform thermal management throughout the FC stack, and particularly, enhanced and consistent performance by the FC stack.

The permeable support layer can be composed of a metal material, such as, for example, a metal mesh. The metal mesh can comprise a thermally conductive metal mesh to facilitate coolant flow therethrough and define a thermally conductive path between the air layer and the hydrogen layer. In particular, the thermally conductive path may be provided between an actively cooled (e.g., a heat dissipating) region of a plate and a hot region (e.g., heat source) of another plate.

The permeable support layer can be composed of a foam material. The foam material can comprise a thermally conductive foam member to define a thermally conductive path between the air layer and the hydrogen layer. In particular, the thermally conductive path may be provided between an actively cooled (e.g., a heat dissipating) region of a plate and a hot region (e.g., heat source) of another plate.

In accordance with one or more embodiments, a fuel cell may comprise one or more of the following: a first fuel cell bipolar plate defining an air layer; a second fuel cell bipolar plate defining a hydrogen layer; a coolant layer, defined by the air layer and the hydrogen layer, having a plurality of coolant microchannels that facilitate flow of a coolant therethrough; and a permeable support layer, extending between the air layer and the hydrogen layer, to define a gap between the air layer and the hydrogen layer that prevents flow blockage of the coolant microchannels while facilitating coolant flow through the permeable support layer.

In accordance with one or more embodiments, a fuel cell may comprise one or more of the following: a first fuel cell bipolar plate defining an air layer having a plurality of air microchannels that facilitate flow of air therethrough; a second fuel cell bipolar plate defining a hydrogen layer having a plurality of hydrogen microchannels that facilitate flow of hydrogen therethrough; a coolant layer, defined by stacking the air layer and the hydrogen layer, having a plurality of coolant microchannels that facilitate flow of a coolant therethrough for thermal management of the fuel cell; and a support layer, composed of one or more permeable, thermally conductive materials and configured to extend laterally between the air layer and the hydrogen later, to define a gap between the air layer and the hydrogen layer that prevents blockage of the coolant microchannels while defining a thermally conductive path between the air layer and the hydrogen layer while facilitating coolant flow through the support layer.

In accordance with one or more embodiments a method of fabricating a fuel cell may comprise one or more of the following: identifying one or more regions of fluid flow blockage between first fuel cell bipolar plate defining an air layer and a second fuel cell bipolar plate defining a hydrogen layer, the air layer and the hydrogen layer defining a coolant layer; and defining a gap between the air layer and the hydrogen layer by positioning a permeable support layer at the identified one or more regions that prevents flow blockage at the coolant layer while facilitating coolant flow through the permeable support layer.

In accordance with one or more of the methods, concurrently with defining a gap between the air layer and the hydrogen layer, a thermally conductive path may be defined between the air layer and the hydrogen layer by positioning the permeable support layer at the identified one or more regions.

In accordance with one or more embodiments a method of fabricating a fuel cell may comprise one or more of the following: identifying regions of direct contact between a first fuel cell bipolar plate defining an air layer and a second fuel cell bipolar plate defining a hydrogen layer, the air layer and the hydrogen layer defining a coolant layer; and defining a gap between the air layer and the hydrogen layer by arranging a permeable support layer at the identified one or more regions to prevent flow blockage at the coolant layer while facilitating coolant flow through the permeable support layer.

In accordance with one or more embodiments a method of fabricating a fuel cell may comprise one or more of the following: identifying one or more regions of fluid flow blockage or direct contact between a first fuel cell bipolar plate defining an air layer and a second fuel cell bipolar plate defining a hydrogen layer, the air layer and the hydrogen layer defining a coolant layer; forming a permeable support layer; and defining a gap between the air layer and the hydrogen layer by arranging the formed permeable support layer at the identified one or more regions to prevent flow blockage at the coolant layer while facilitating coolant flow through the permeable support layer.

In accordance with one or more embodiments a method of fabricating a fuel cell may comprise one or more of the following: identifying one or more regions of fluid flow blockage or direct contact between a first fuel cell bipolar plate defining an air layer and a second fuel cell bipolar plate defining a hydrogen layer, the air layer and the hydrogen layer defining a coolant layer; forming a permeable support layer having a thermally conductive material composition; and defining a gap and a thermally conductive path between the air layer and the hydrogen layer by arranging the formed permeable support layer at the identified one or more regions to prevent flow blockage at the coolant layer while facilitating coolant flow through the permeable support layer.

In accordance with one or more embodiments a method of fabricating a fuel cell may comprise one or more of the following: identifying one or more regions of direct contact between a first fuel cell bipolar plate defining an air layer and a second fuel cell bipolar plate defining a hydrogen layer, the air layer and the hydrogen layer defining a coolant layer; forming a permeable support layer having a thermally conductive material composition; and defining a gap and a thermally conductive path between the air layer and the hydrogen layer by arranging the formed permeable support layer at the identified one or more regions to prevent flow blockage at the coolant layer while facilitating coolant flow through the permeable support layer.

BRIEF DESCRIPTION OF THE SEVERAL VIEWS OF THE DRAWINGS

The various advantages of the embodiments of the present invention will become apparent to one skilled in the art by reading the following specification and appended claims, and by referencing the following drawings, in which:

DETAILED DESCRIPTION

Figure 1:
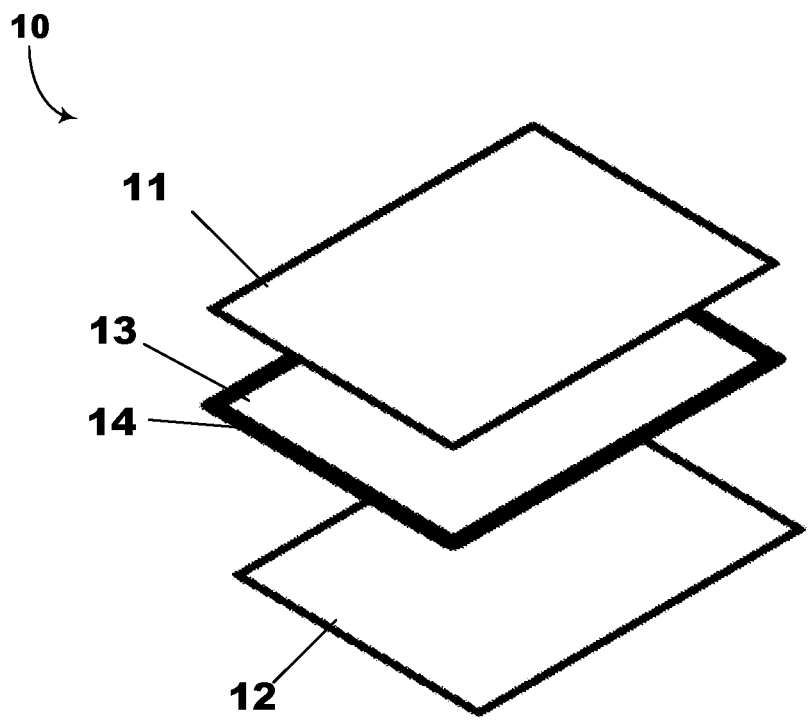
FIG. 1 illustrates an example multi-layered fluid flow network of a fuel cell, in accordance with one or more embodiments shown and described herein.
Figure 2:
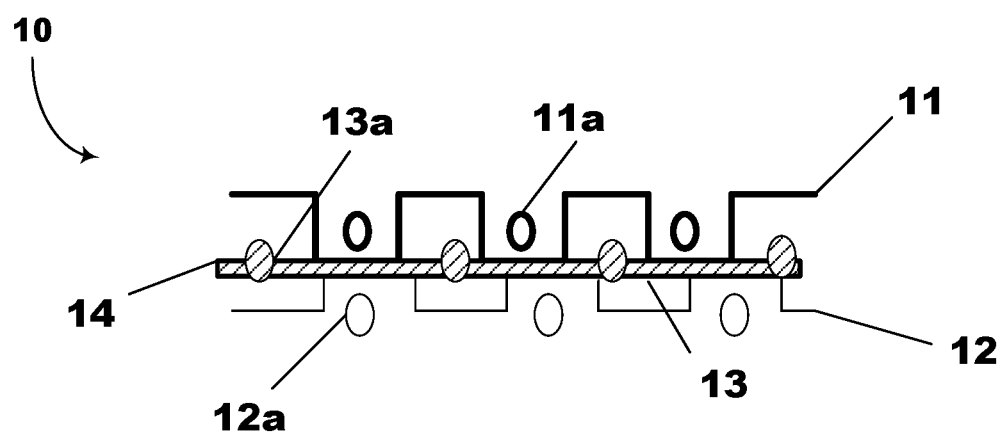
FIG. 2 illustrates a cross-sectional view of an example multi-layered fluid flow network of a fuel cell, in accordance with one or more embodiments shown and described herein.

As illustrated in FIGS. 1 and 2, a fuel cell 10 comprises a first bipolar plate defining an air layer 11, a second bipolar plate defining a hydrogen layer 12. The air layer 11 comprises a plurality of independently formed air fluid flow network or microchannels 11a, and the hydrogen layer 12 comprises a plurality of independently formed hydrogen fluid flow network or microchannels 12a. Through the superimposition or stacking of the air plate 11 and the hydrogen plate 12, a coolant layer 13 comprising a plurality of coolant flow network or microchannels 13a is defined. In this way, the coolant fluid flow network or microchannel configuration 13a is dependent upon the independently-formed air microchannels 11a and hydrogen microchannels 12a.

In accordance with one or more embodiments, to prevent blockage in the coolant microchannels 13a, particularly in regions or interfaces where there is direct contact between the air plate 11 and the hydrogen plate 12, a very thin permeable layer 14 is disposed and strategically positioned between the air plate 11 and the hydrogen plate 12 to facilitate coolant flow in the coolant microchannels 13a. For example, the permeable support layer 14 can be strategically positioned between the air plate 11 and the hydrogen plate 12.

In accordance with one or more embodiments, the permeable support layer 14 may be composed of a metal material. The permeable support layer 14 may have a structural configuration of permeable metal mesh to facilitate flow of coolant therethrough. Such a structural configuration would enhance the overall thermal management of the FC.

In accordance with one or more embodiments, the permeable support layer 14 may be composed of one or more thermally conductive materials. The permeable support layer 14 may have a structural configuration of a permeable thermally conductive mesh to facilitate flow of coolant therethrough while also define a thermally conductive path between an actively cooled region of a plate and a hot region of another plate. Such a structural configuration would enhance the overall thermal management of the FC, which, in turn, results in enhanced and consistent performance by the FC stack.

In accordance with one or more embodiments, the permeable support layer 14 may be composed of a foam material to facilitate flow of coolant therethrough. Such a structural configuration would enhance the overall thermal management of the FC, which, in turn, results in enhanced and consistent performance by the FC stack.

In accordance with one or more embodiments, the permeable support layer 14 may be sintered to the air plate 11 and the hydrogen plate 12 in such a manner that the overall height of the permeable support layer 14 ensures existence of a gap between the air plate 11 and the hydrogen plate 12.

In accordance with one or more embodiments, the permeability is customized and graded across the permeable support layer 14 to provide optimized fluid flow through the coolant layer 13.

FIGS. 3 to 7 illustrate flowcharts of methods 100, 200, 300, 400, 500 for fabricating an FC, in accordance with embodiments. Each method 100, 200, 300, 400, 500 is to yield an optimized design of an FC having microchannel configurations that reduce the overall size of the FC. Moreover, each method 100, 200, 300, 400, 500 is to yield an optimized design of a FC bipolar plate having enhanced operational performance by facilitating more uniform thermal management of the MEA at the cooling layer. Such uniform thermal management, in turn, facilitates more uniform reactions at the MEA that in turn, maximizes the generation of electricity by the FC stack.

The flowchart of each respective method 100, 200, 300, 400, 500 corresponds to the schematic illustrations of FIGS. 1 and 2 which are set forth and described herein. In accordance with embodiments, each method 100, 200, 300, 400, 500 may be implemented, for example, using logic instructions (e.g., software), configurable logic, fixed-functionality hardware logic, etc., or any combination thereof. As an example, software executed on one or more computer systems may provide functionality described or illustrated herein. Each computing system respectively includes one or more processors. In particular, software executing on one or more computer systems may perform one or more fabrication or processing blocks of each method 100, 200, 300, 400, 500 described or illustrated herein or provides functionality described or illustrated herein.

Figure 3:
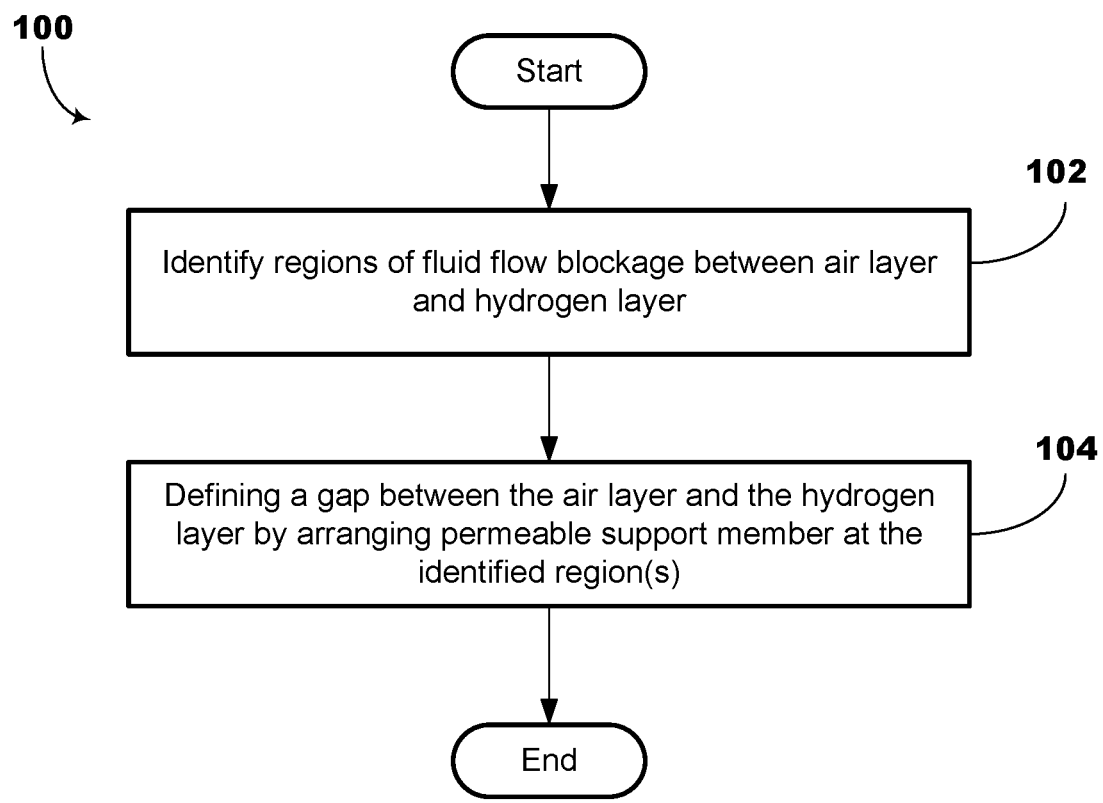
FIGS. 3 to 7 illustrate a schematic diagram of example methods of fabricating an FC, in accordance with one or more embodiments shown and described herein.

As illustrated in FIG. 3, in the method 100, illustrated processing block 102 includes identifying (e.g., in response to designing the Turing-patterned microstructures) one or more regions of fluid flow blockage between a first fuel cell bipolar plate defining an air layer and a second fuel cell bipolar plate defining a hydrogen layer, the air layer and the hydrogen layer defining a coolant layer.

The method 100 may then proceed to illustrated process block 104, which includes defining a gap between the air layer and the hydrogen layer by arranging a permeable support layer at the identified one or more regions to prevent flow blockage at the coolant layer while facilitating coolant flow through the permeable support layer.

In accordance with the method 100, the permeable support layer can be strategically positioned between the air layer and the hydrogen layer in the identified regions where there is no air microchannel and no hydrogen microchannel.

The method 100 can then terminate or end after completion of process block 104.

Figure 4:
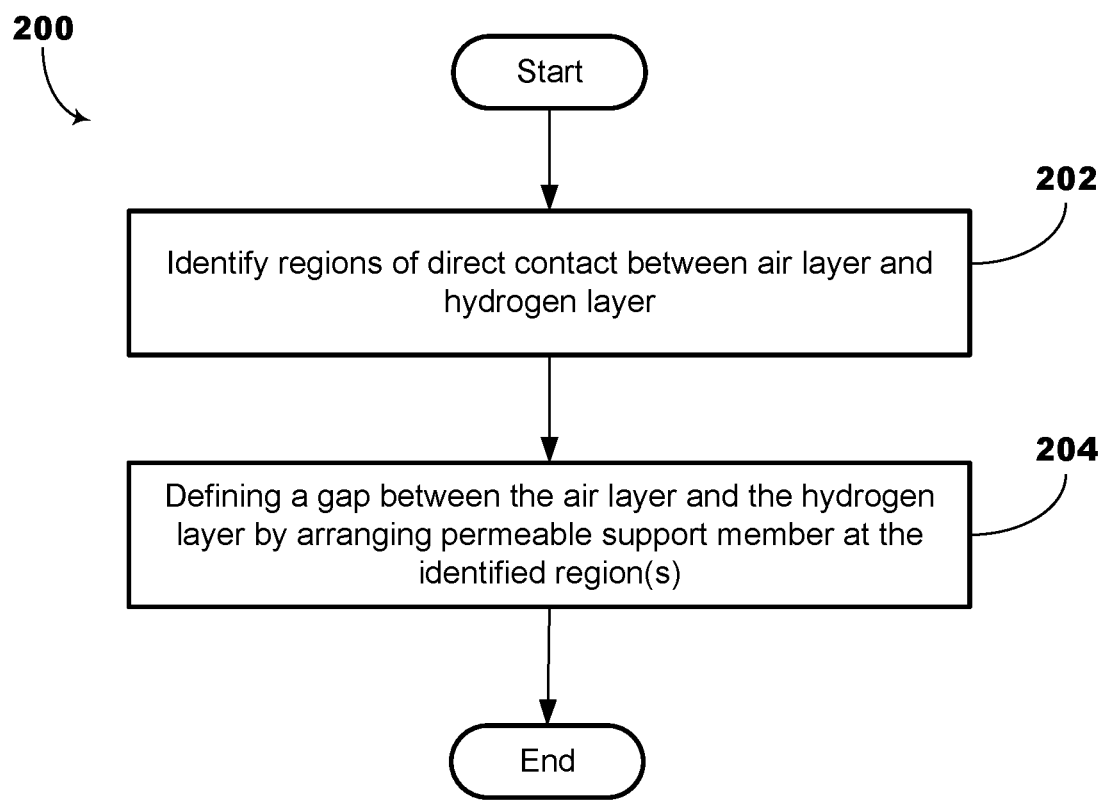

As illustrated in FIG. 4, in the method 200, illustrated processing block 202 includes identifying (e.g., in response to designing the Turing-patterned microstructures) regions of direct contact between a first fuel cell bipolar plate defining an air layer and a second fuel cell bipolar plate defining a hydrogen layer, the air layer and the hydrogen layer defining a coolant layer.

The method 200 may then proceed to illustrated process block 204, which includes defining a gap between the air layer and the hydrogen layer by arranging a permeable support layer at the identified one or more regions to prevent flow blockage at the coolant layer while facilitating coolant flow through the permeable support layer.

In accordance with the method 200, the permeable support layer can be strategically positioned between the air layer and the hydrogen layer at the identified regions where there is no air microchannel and no hydrogen microchannel.

The method 200 can then terminate or end after completion of process block 204.

Figure 5:
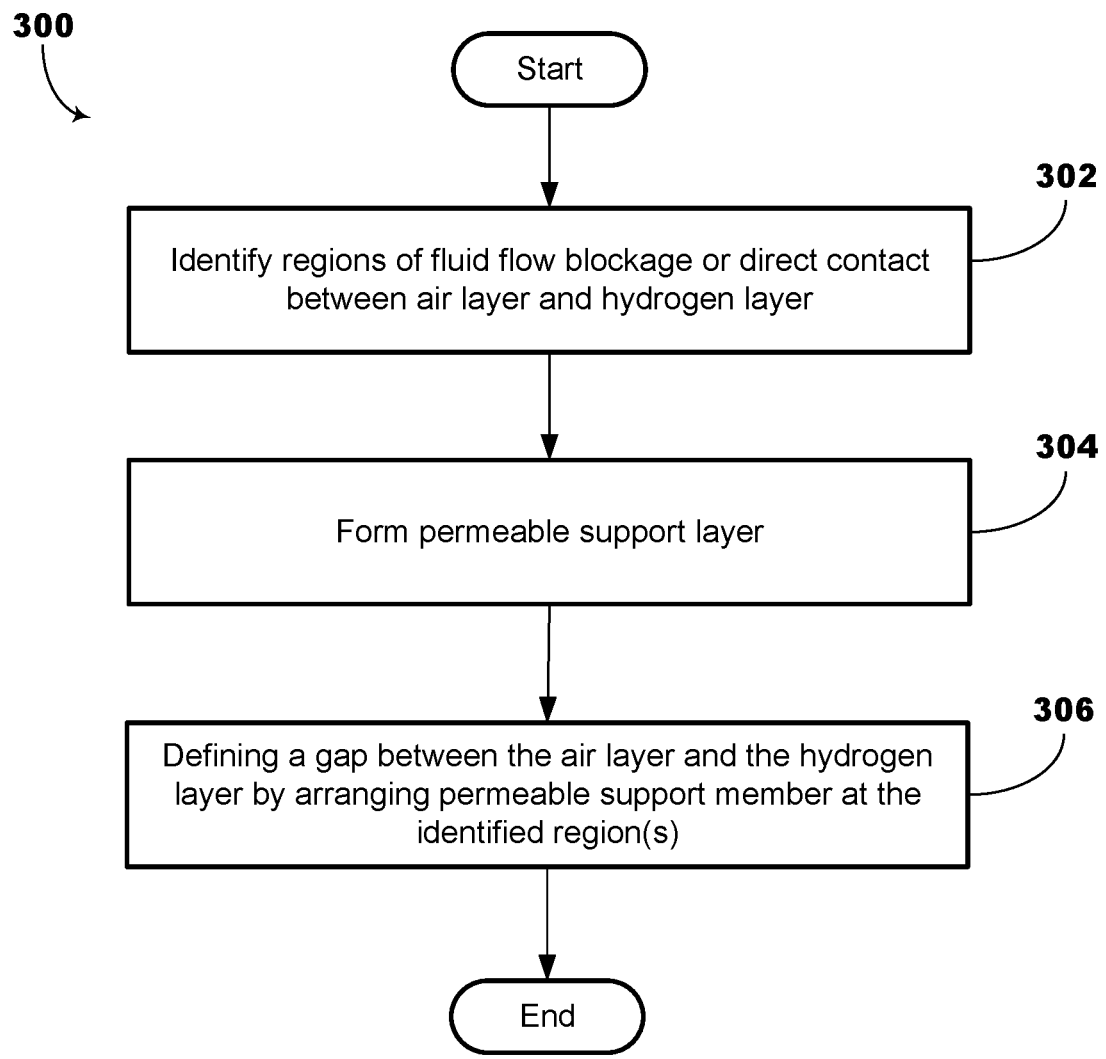

As illustrated in FIG. 5, in the method 300, illustrated processing block 302 includes identifying (e.g., in response to designing the Turing-patterned microstructures) one or more regions of fluid flow blockage or direct contact between a first fuel cell bipolar plate defining an air layer and a second fuel cell bipolar plate defining a hydrogen layer, the air layer and the hydrogen layer defining a coolant layer.

The method 300 may then proceed to illustrated process block 304, which includes forming a permeable support layer.

The method 300 may then proceed to illustrated process block 306, which includes defining a gap between the air layer and the hydrogen layer by arranging the formed permeable support layer at the identified one or more regions to prevent flow blockage at the coolant layer while facilitating coolant flow through the permeable support layer.

In accordance with the method 300, the permeable support layer can be strategically positioned between the air layer and the hydrogen layer in the identified regions where there is no air microchannel and no hydrogen microchannel.

The method 300 can then terminate or end after completion of process block 306.

Figure 6:
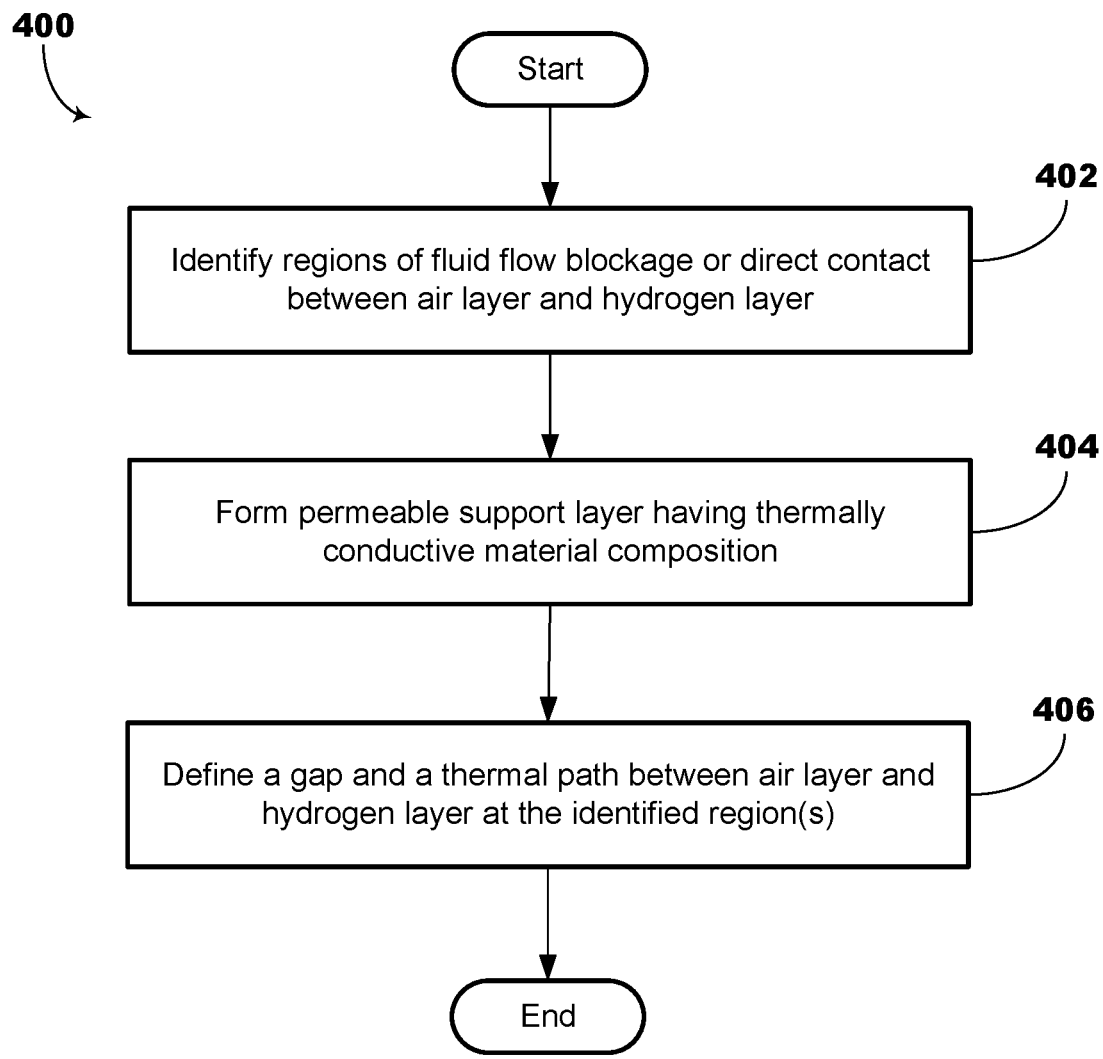

As illustrated in FIG. 6, in the method 400, illustrated processing block 402 includes identifying (e.g., in response to designing the Turing-patterned microstructures) one or more regions of fluid flow blockage or direct contact between a first fuel cell bipolar plate defining an air layer and a second fuel cell bipolar plate defining a hydrogen layer, the air layer and the hydrogen layer defining a coolant layer.

The method 400 may then proceed to illustrated process block 404, which includes forming a permeable support layer having a thermally conductive material composition.

The method 400 may then proceed to illustrated process block 406, which includes defining a gap and a thermally conductive path between the air layer and the hydrogen layer by arranging the formed permeable support layer at the identified one or more regions to prevent flow blockage at the coolant layer while facilitating coolant flow through the permeable support layer.

In accordance with the method 400, the permeable support layer can be strategically positioned between the air layer and the hydrogen plate in the identified regions where there is no air microchannel and no hydrogen microchannel.

The method 400 can then terminate or end after completion of process block 406.

Figure 7:
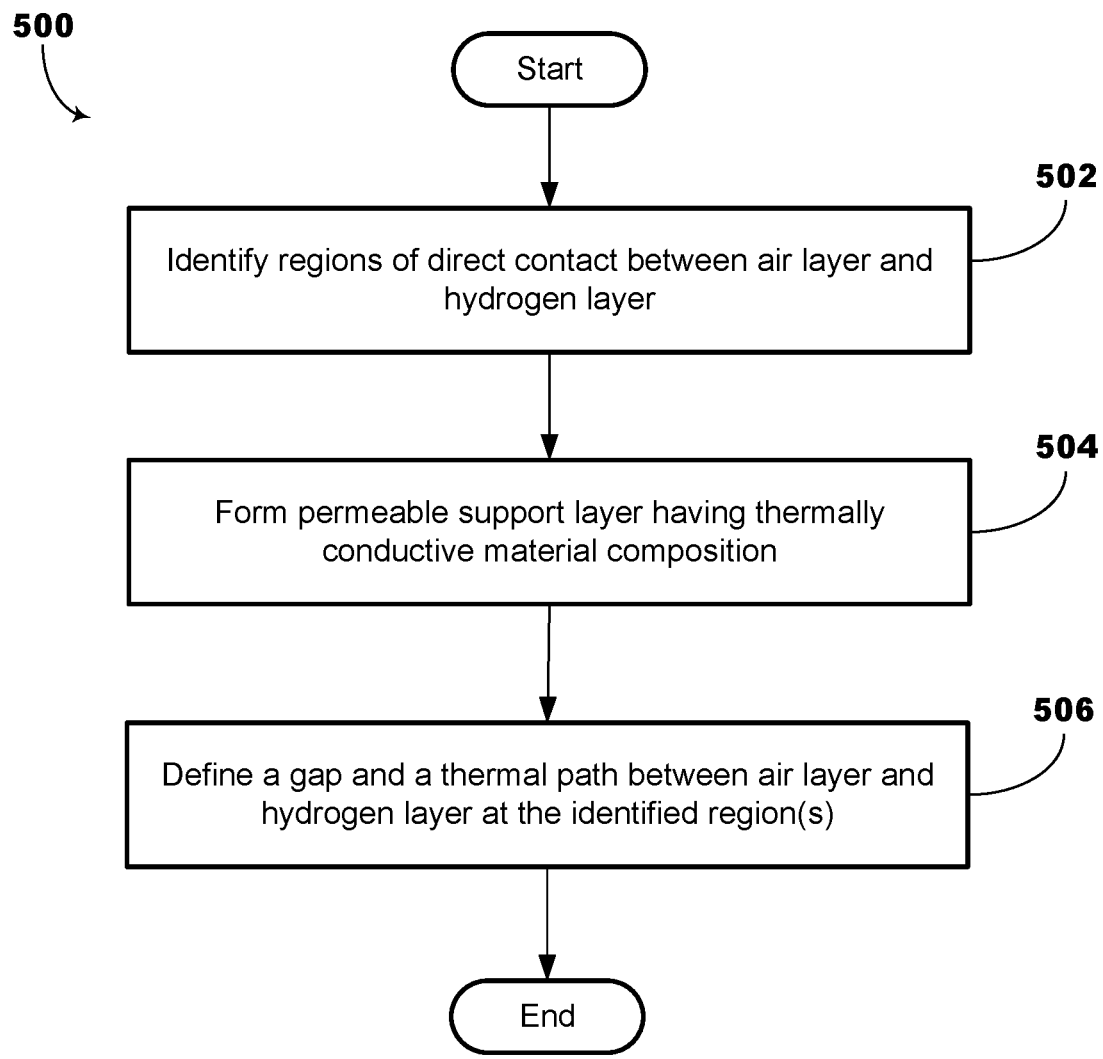

As illustrated in FIG. 7, in the method 500, illustrated processing block 502 includes identifying (e.g., in response to designing the Turing-patterned microstructures) one or more regions of direct contact between a first fuel cell bipolar plate defining an air layer and a second fuel cell bipolar plate defining a hydrogen layer, the air layer and the hydrogen layer defining a coolant layer.

The method 500 may then proceed to illustrated process block 504, which includes forming a permeable support layer having a thermally conductive material composition.

The method 500 may then proceed to illustrated process block 506, which includes defining a gap and a thermally conductive path between the air layer and the hydrogen layer by arranging the formed permeable support layer at the identified one or more regions to prevent flow blockage at the coolant layer while facilitating coolant flow through the permeable support layer.

In accordance with the method 500, the permeable support layer can be strategically positioned between the air layer and the hydrogen layer to also define one or more coolant microchannels.

In accordance with the method 500, the permeable support layer can be strategically positioned between the air layer and the hydrogen layer in the identified regions where there is no air microchannel and no hydrogen microchannel.

The method 500 can then terminate or end after completion of process block 506.

The terms "coupled," "attached," or "connected" may be used herein to refer to any type of relationship, direct or indirect, between the components in question, and may apply to electrical, mechanical, fluid, optical, electromagnetic, electromechanical or other connections. In addition, the terms "first," "second," etc. are used herein only to facilitate discussion, and carry no particular temporal or chronological significance unless otherwise indicated.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

What is claimed is:

1. A fuel cell, comprising:
   a first fuel cell bipolar plate defining an air layer having a plurality of air microchannels that facilitate flow of air therethrough;
   a second fuel cell bipolar plate defining a hydrogen layer having a plurality of hydrogen microchannels that facilitate flow of hydrogen therethrough;
   a coolant layer, defined by an opposite side of the plurality of air microchannels of the first fuel cell bipolar plate and an opposite side of the plurality of hydrogen microchannels of the second fuel cell bipolar plate, having a plurality of coolant microchannels that facilitate flow of a coolant therethrough; and
   a permeable support layer, comprising a plurality of additional coolant microchannels, extending laterally across the plurality of coolant microchannels and between the opposite side of the plurality of air microchannels of the first fuel cell bipolar plate and the opposite side of the plurality of hydrogen microchannels of the second fuel cell bipolar plate, the permeable support layer contacting the opposite side of the plurality of air microchannels of the first fuel cell bipolar plate and the opposite side of the plurality of hydrogen microchannels of the second fuel cell bipolar plate and defining a physical gap between the first fuel cell bipolar plate and the second fuel cell bipolar plate preventing the first fuel cell bipolar plate and the second fuel cell bipolar plate from touching while facilitating coolant flow through the plurality of the additional coolant microchannels within the permeable support layer, wherein the permeable support layer is positioned between the first fuel cell bipolar plate and the second fuel cell bipolar plate at least where an air microchannel of the plurality of air microchannels and a hydrogen microchannel of the plurality of hydrogen microchannels are aligned.

2. The fuel cell of claim 1, wherein the permeable support layer is composed of a metal material.

3. The fuel cell of claim 2, wherein a permeability of the permeable support layer is graded across the permeable support layer.

4. The fuel cell of claim 2, wherein the permeable support layer comprises a thermally conductive metal mesh to facilitate coolant flow therethrough and define a thermally conductive path between the air layer and the hydrogen layer.

5. The fuel cell of claim 1, wherein the permeable support layer is composed of a foam material.

6. The fuel cell of claim 5, wherein the permeable support layer comprises a thermally conductive foam member to define a thermally conductive path between the air layer and the hydrogen layer.

7. The fuel cell of claim 1, wherein the permeable support layer is sintered to the first fuel cell bipolar plate and the second fuel cell bipolar plate.

8. A fuel cell, comprising:
   a first fuel cell bipolar plate defining an air layer having a plurality of air microchannels that facilitate flow of air therethrough;
   a second fuel cell bipolar plate defining a hydrogen layer having a plurality of hydrogen microchannels that facilitate flow of hydrogen therethrough;
   a coolant layer, defined by stacking the first fuel cell bipolar plate and the second fuel cell bipolar plate, having a plurality of coolant microchannels that facilitate flow of a coolant therethrough for thermal management of the fuel cell; and
   a support layer, comprising a plurality of additional coolant microchannels, and composed of one or more permeable, thermally conductive materials and configured to extend laterally across the plurality of coolant microchannels and between the first fuel cell bipolar plate and the second fuel cell bipolar plate, the support layer contacting an opposite side of the plurality of air microchannels of the first fuel cell bipolar plate and an opposite side of the plurality of hydrogen microchannels of the second fuel cell bipolar plate and defining a physical gap between the first fuel cell bipolar plate and the second fuel cell bipolar plate preventing the first fuel cell bipolar plate and the second fuel cell bipolar plate from touching while defining a thermally conductive path between the air layer and the hydrogen layer while facilitating coolant flow through the plurality of additional coolant microchannels within the support layer.

9. The fuel cell of claim 8, wherein the support layer is composed of a metal material.

10. The fuel cell of claim 9, wherein the support layer comprises a metal mesh.

11. The fuel cell of claim 8, wherein the support layer is composed of a foam material.

12. The fuel cell of claim 8, wherein the support layer is sintered to the first fuel cell bipolar plate and the second fuel cell bipolar plate.

13. A method of fabricating the fuel cell of either claim 1 or claim 8, the method comprising:
    identifying one or more regions of fluid flow blockage between the first fuel cell bipolar plate and the second fuel cell bipolar plate; and
    defining the physical gap between the air layer and the hydrogen layer by arranging the permeable support layer at the identified one or more regions that prevents flow blockage at the coolant layer while facilitating coolant flow through the permeable support layer.

14. The method of claim 13, wherein the permeable support layer is composed of a metal material.

15. The method of claim 13, wherein the permeable support layer comprises a metal mesh.

16. The method of claim 15, wherein the permeable support layer is composed of one or more thermally conductive metal materials.

17. The method of claim 16, further comprising, concurrently with defining the physical gap between the air layer and the hydrogen layer, defining a thermally conductive path between the air layer and the hydrogen layer by positioning the permeable support layer at the identified one or more regions.

18. The method of claim 13, wherein the permeable support layer is composed of a foam material.

19. The method of claim 18, wherein the permeable support layer is composed of one or more thermally conductive foam materials.

20. The method of claim 19, further comprising, concurrently with defining the physical gap between the air layer and the hydrogen layer, defining a thermally conductive path between the air layer and the hydrogen layer by positioning the permeable support layer at the identified one or more regions.

* * * * *